Dec. 31, 1929.                A. O. NORDINE                1,741,873
                        TRAILER FRAME CONSTRUCTION
                         Filed May 31, 1928      2 Sheets-Sheet 1
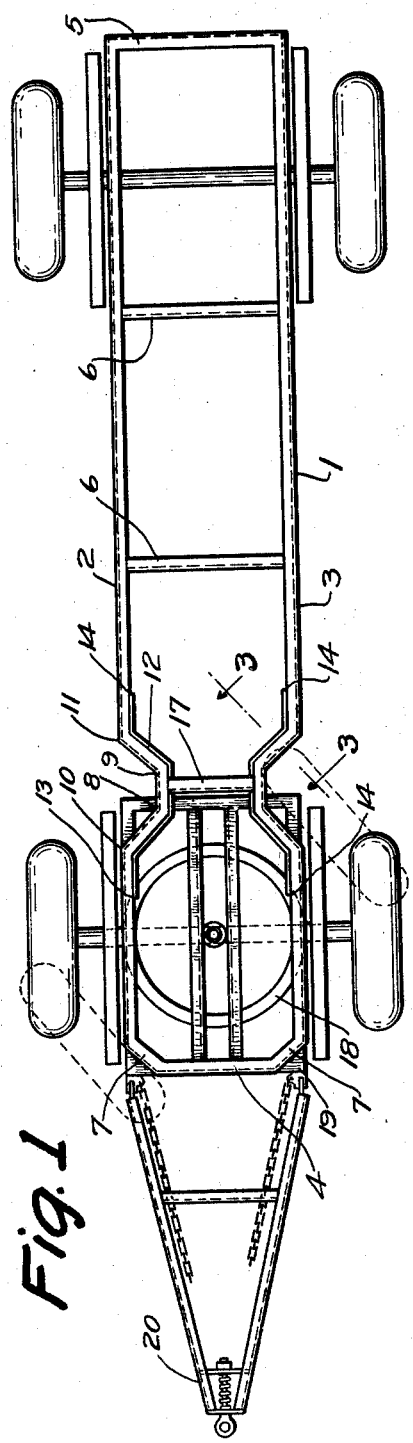
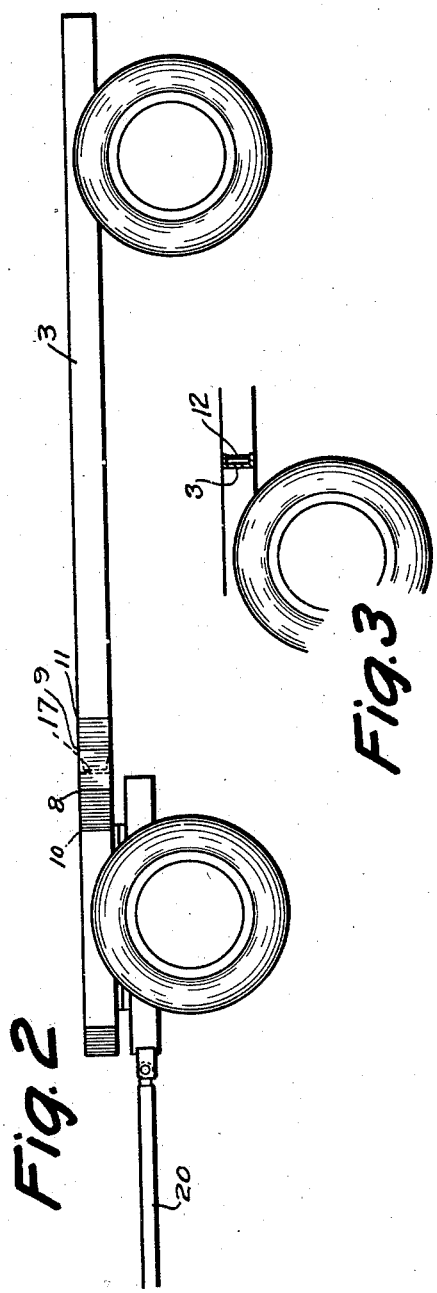
INVENTOR
Axel O. Nordine
BY
Harry Bowen
ATTORNEY Dec. 31, 1929.　　　A. O. NORDINE　　　1,741,873
TRAILER FRAME CONSTRUCTION
Filed May 31, 1928　　　2 Sheets-Sheet 2
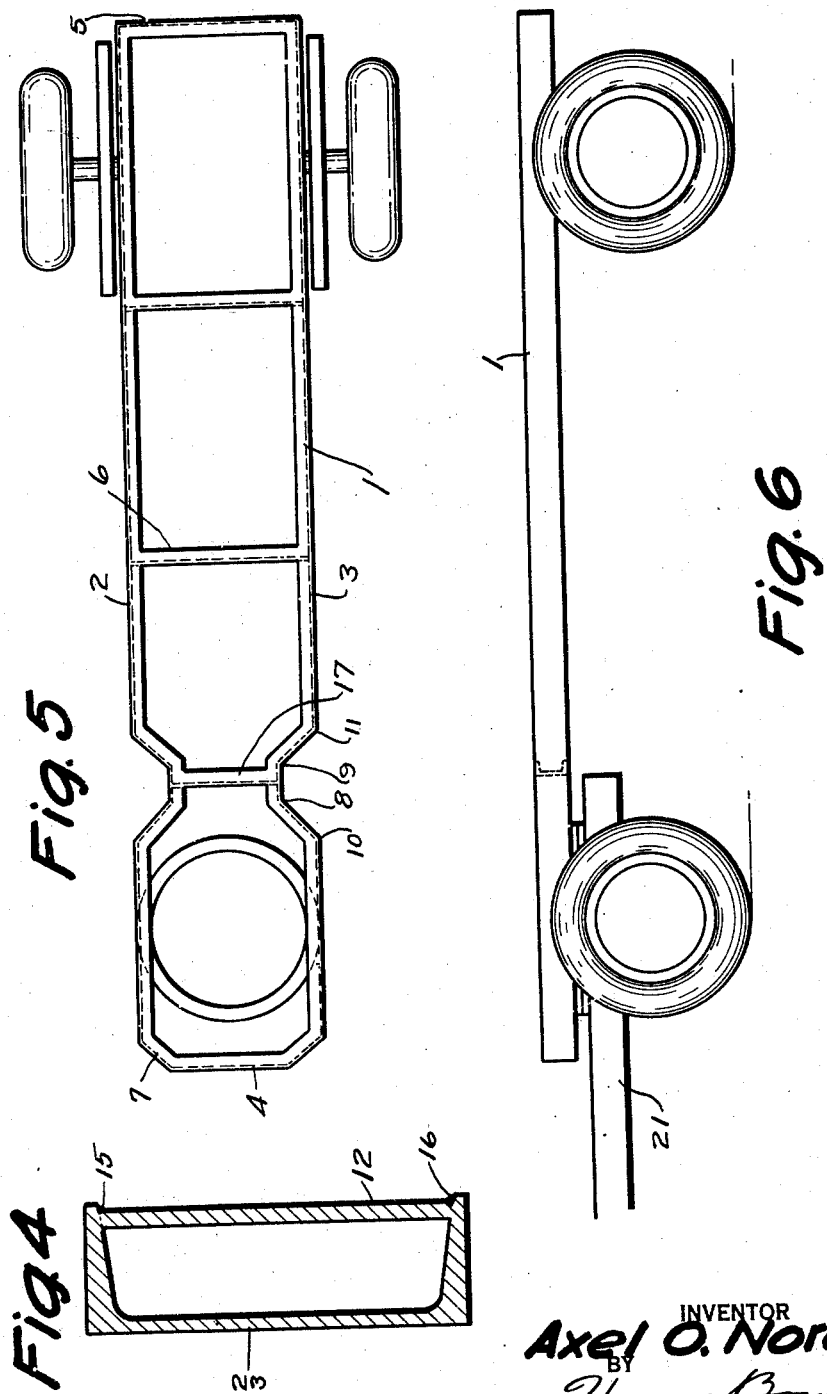

Patented Dec. 31, 1929

1,741,873

UNITED STATES PATENT OFFICE

AXEL O. NORDINE, OF SEATTLE, WASHINGTON

TRAILER-FRAME CONSTRUCTION

Application filed May 31, 1928. Serial No. 281,644.

The invention is a frame for trailers or the like which is provided with indentations in the sides thereof into which the front wheels may extend when turning on a short radius.

The object of the invention is to provide a frame for trailers or the like which is so constructed that the trailer may be turned on a comparatively short radius.

Another object of the invention is to provide a trailer frame having a comparatively large turn table and in which the frame is so constructed that the trailer may be turned in a comparatively short radius.

A further object of the invention is to provide a means for reenforcing a frame for trailers or the like so that indentations may be provided in the sides to permit a short turning radius.

And a still further object of the invention is to provide simple and efficient means for constructing a trailer frame which will not reduce the surface area and which will permit the trailer to turn on a short radius.

With these ends in view the invention embodies a trailer frame having indentations in the sides thereof to clear the wheels when turning on a short radius with reenforcing means at the indentations and in which the foreward corners of the frame are cut diagonally to also clear the wheels at the front.

Other features and advantages of the invention will appear from the following description, taken in connection with the drawings, wherein:—

Figure 1 is a plan view of a trailer frame of the four wheel type.

Figure 2 is a side elevation of the trailer shown in Figure 1.

Figure 3 is a sectional view on line 3—3 of Figure 1 to show the relative positions of the wheel and frame when making an extreme turn.

Figure 4 is a detail showing a cross section through a member of the frame to show the means of reenforcing the frame at the point of the indentation.

Figure 5 is a plan view showing a two wheel trailer which may be attached to the rear of a truck.

Figure 6 is a side elevation of the frame shown in Figure 5 showing the trailer frame mounted upon the rear of the truck.

In the drawings the device is shown as it would be made wherein numeral 1 indicates a trailer frame which may be of any suitable type or design and constructed in any suitable manner. In the design shown it is made of channels with side beams, 2 and 3, tied together at the ends by means 4 and 5 and tied intermediate of the end by struts 6. The side members 2 and 3 are connected to the cross beam 4 at the front by diagonal sections 7 which may be formed by bending the ends of the side members or cross beams or bending the frame as a unit or by small sections welded into place forming a complete strut. These sections are of sufficient size to clear the side of a wheel as shown in dotted lines in Figure 1. It is also understood that any other suitable means may be used to connect the members at the front to provide clearance.

The members 2 and 3 are bent inward to the points 8 and 9 between the points 10 and 11. It is understood that these points may be positioned so that the frame will clear a wheel of any suitable design or size and the depth of the indentations may be greater or lesser as may be desired. It will be appreciated that in bending the side members of the frame in this manner there will be a tendency to weaken the frame at this point and the frame is therefore provided with reenforcing plates as indicated by the numeral 12 which may extend approximately from points 13 to points 14 and these plates may be attached to the edges of the channel flanges as shown in Figure 1 or placed between the edges of the flanges and held at the points 15 and 16 as shown in Figure 4. It is also understood that any suitable means may be used for reenforcing these members at the indentations. In the design shown the members are further reenforced by a cross member 17 which forms a tie between the side members. The member 17 may also be of any suitable shape or design and may be attached to the side members in any suitable manner or position.

The frame is shown and described as made of channels, however, any structural shape or shapes may be used, and these shapes may be made of sufficient size to compensate for the offsets so that all reenforcing may be omitted.

It will be understood that other changes may be made in the construction without departing from the spirit of the invention. One of which changes may be in the providing of similar indentations in a frame of any other type or design, another may be in the use of indentations of another shape and still another may be in the use of other means for reenforcing the frame at the indentations.

The construction will be readily understood from the foregoing description. In use the frame may be provided as shown in Figure 1 so that it may be mounted upon a turn-table 18 on a truck 19 and the truck 19 may be attached to the rear of a motor truck or to another trailer by a frame 20; or the frame may be provided as shown in Figure 5 and the turn-table placed upon the rear of a motor truck as indicated by the numeral 21 and shown in Figure 6 and arranged so that the rear wheels of a truck will extend into the indentations when making a turn. It is also understood that the frame may be provided for any other combination of trailers or a trailer of any suitable design and any other suitable means may be used for connecting a trailer or frame to a truck or vehicle.

Having thus fully described the invention, what I claim as new and desire to secure by Letters Patent is:

In a device of the class described a frame formed of channels with parallel side beams connected at the ends and intermediate of the ends, the forward corners being formed diagonally to clear the wheels at the front when making a turn, the said side members provided with indentations to clear the wheels when making a turn at the rear, a strut connecting the side members at the indentations and reenforcing plates welded between the tips of the flanges of the said side members and extending from points slightly ahead of the beginning of the said indentations to points slightly behind the finish of the said indentations.

AXEL O. NORDINE.